No. 889,593. PATENTED JUNE 2, 1908.
J. C. FLEISCHMANN.
NUT LOCK.
APPLICATION FILED DEC. 19, 1907.

Witnesses
J. C. Simpson
Geo. W. Tries.

Inventor
John C. Fleischmann
By Chandler & Chandler
Attorneys.

UNITED STATES PATENT OFFICE.

JOHN C. FLEISCHMANN, OF LITITZ, PENNSYLVANIA.

NUT-LOCK.

No. 889,593.      Specification of Letters Patent.      Patented June 2, 1908.

Application filed December 19, 1907. Serial No. 407,227.

*To all whom it may concern:*

Be it known that I, JOHN C. FLEISCHMANN, a citizen of the United States, residing at Lititz, in the county of Lancaster, State of Pennsylvania, have invented certain new and useful Improvements in Nut-Locks; and I do hereby declare the following to be a full, clear, and exact description of the invention, such as will enable others skilled in the art to which it appertains to make and use the same.

This invention has relation to a new and useful improvement in nut locks.

My invention consists in constructing a nut lock from a single piece of spring sheet metal which is given a frusto-conical shape having a lower approximately cylindrical serrated gripping flange, this flange being adapted to be held in yielding or cushioned contact with the base to which it is secured and in conjunction with this spring washer I use a nut provided with a plurality of angled faced seatings adapted to be engaged by one or more ears which are stamped up from and form an integral part of the spring washer as will be disclosed more fully hereinafter.

Figure 1:
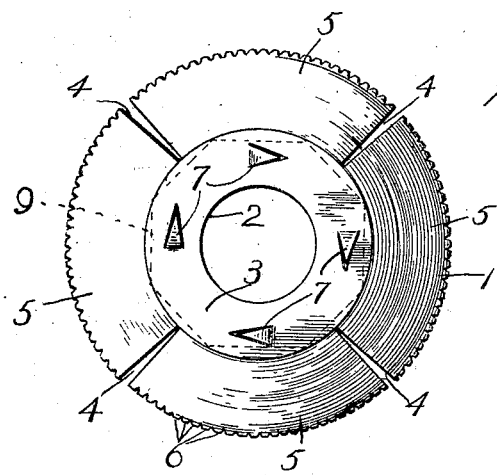
Figure 2:
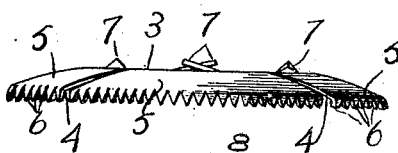
Figure 3:
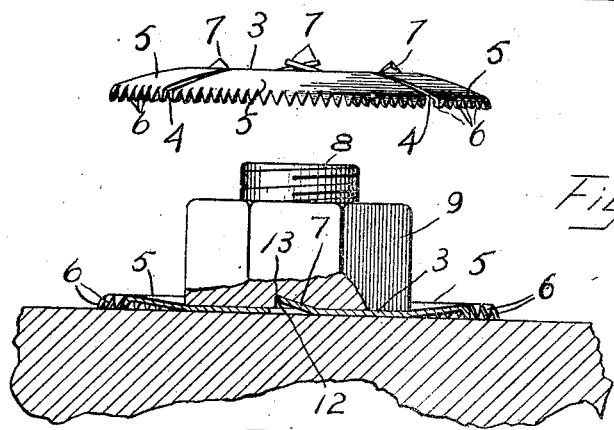
Figure 4:
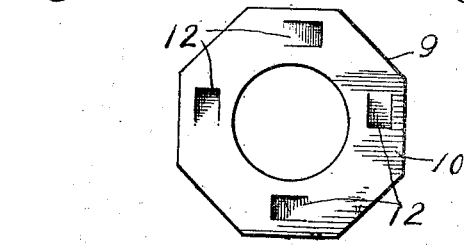

In the accompanying drawings Figure 1 shows a face view of a washer embodying my invention. Fig. 2 discloses an edge view thereof. Fig. 3 shows a washer and nut constructed according to my invention partly in section, and, Fig. 4 a bottom view disclosing the seating-provided under face of the nut as used in my invention.

The nature of my invention consists in the construction of a nut and a washer adapted to be detachably secured and constructed to prevent any accidental rotation of the nut.

In carrying out the object of my invention I construct a washer 1 made of a single piece of spring sheet metal which is stamped or cut out round as shown in Fig. 1 and is provided with a central bolt opening 2. Surrounding this bolt opening 2 is a flat circular portion 3 which forms a base upon which the nut shown in dotted outline in Fig. 1 rotates. The portion extending beyond this base forming portion 3 is provided with a set of radially disposed slots 4 which slots or incisions extend up to said flat circular portion 3 as is clearly shown in Figs. 1 and 2. By these means I provide the washer with four wings 5 and these are then curved and bent at an angle to the base portion 3 as is shown in Fig. 2 to give said washer a cone-shaped conformation, the edges finally of each wing portion being bent at an angle as is shown more clearly in Fig. 2, the peripheral edges of these portions 6 forming approximately cylindrically disposed gripping flanges as clearly shown. Stamped up from the circular portion 3 and forming an integral part thereof are the spear headed or pointed ears 7 as clearly disclosed in Fig. 1. In connection with such a washer I use an ordinary bolt 8 as shown in Fig. 3 to which is secured a nut 9, the under face of which 10 is provided with angled faced seatings 12, against the vertical or abrupt shoulder 13 of which the stop ears 7 find a seating as shown in Fig. 3. In this last mentioned figure the nut 9 is shown as having been forced down to find a firm seating upon the base surfaces 3 of the washer which results in the wing portions 5 being strained and spring held so that their serrated edges are in a spring cushioned contact with the base surface to which the washer is clamped. Now any displacement of this nut 9 will be prevented in that the shoulders 7 will be in engagement with the nut while the gripping flanges 6 will be so firmly cushioned against the base as to take up and compensate any trembling or jarring movement that might otherwise tend to dislodge or accidentally rotate the washer.

It is of course understood that these washers can be used in securing nuts to wooden or other base surfaces and that they may be made of various sizes and different materials.

Having thus described my said invention what I claim as new is

1. A complete spring washer made of a single piece of sheet metal having a central bolt perforation and a flat circular portion surrounding said perforation, of ears stamped up from said circular portion and forming an integral part thereof, said washer being provided with a plurality of radial border incisions extending up to said flat circular portion forming wings, said wings being curved and bent at an angle to said flat portion to give said washer a cone-shaped conformation, the edges of each wing portion being serrated and bent at an angle to said wing portions to form an approximately cylindrical gripping flange as disclosed.

2. A complete spring washer made of a single piece of sheet metal having a central bolt perforation and a flat circular portion surrounding said perforation, of ears stamped up from said circular portion and forming an integral part thereof, said washer being provided with a plurality of radial border incisions extending up to said flat circular portion forming wings, said wings being curved and bent at an angle to said flat portion to give said washer a cone-shaped conformation, the edges of each wing portion being serrated and bent at an angle to said wing portions to form an approximately cylindrical gripping flange, and a nut having angled faced seatings adapted to be engaged by said ears, all arranged as disclosed.

In testimony whereof, I affix my signature, in presence of two witnesses.

JOHN C. FLEISCHMANN.

Witnesses:
HARRY KEPPEL,
WILLIAM M. KISSINGER.